US011203091B2

(12) United States Patent
Jeannerat et al.

(10) Patent No.: US 11,203,091 B2
(45) Date of Patent: Dec. 21, 2021

(54) FIVE AXIS MACHINE TOOL (71) Applicant: Haute Ecole ARC, Neuchâtel (CH)

(72) Inventors: Claude Jeannerat, Neuchâtel (CH);
Fabrice Droz, Neuchâtel (CH);
Christophe Haag, Neuchâtel (CH)

(73) Assignee: Haute Ecole ARC, Neuchâtel (CH)

( * ) Notice: Subject to any disclaimer, the term of this patent is extended or adjusted under 35 U.S.C. 154(b) by 0 days.

(21) Appl. No.: 16/084,289

(22) PCT Filed: Apr. 19, 2017

(86) PCT No.: PCT/IB2017/052248
§ 371 (c)(1),
(2) Date: Sep. 12, 2018

(87) PCT Pub. No.: WO2017/182963
PCT Pub. Date: Oct. 26, 2017

(65) Prior Publication Data
US 2019/0084102 A1 Mar. 21, 2019

(30) Foreign Application Priority Data
Apr. 19, 2016 (CH) .......................... 516/16

(51) Int. Cl.
B23B 11/00 (2006.01)
B23C 1/06 (2006.01)
(Continued)

(52) U.S. Cl.
CPC .............. B23Q 1/488 (2013.01); B23B 3/065 (2013.01); B23C 1/002 (2013.01); B23C 1/06 (2013.01);
(Continued)

(58) Field of Classification Search
CPC .................. B23Q 1/488; B23Q 1/4857; B23Q 1/01–1/017; B23Q 2220/004;
(Continued)

(56) References Cited

U.S. PATENT DOCUMENTS 3,998,127 A * 12/1976 Romeu ...................... B23C 1/14
409/225
4,951,376 A * 8/1990 Grund ....................... B23B 3/06
29/27 C
(Continued)

FOREIGN PATENT DOCUMENTS

CN 2011/86387 Y 1/2009
CN 202665727 U * 1/2013
(Continued)

OTHER PUBLICATIONS

Machine Translation of CN 202665727 U, which CN '727 was published Jan. 2013.*

(Continued)

Primary Examiner — Erica E Cadugan
(74) Attorney, Agent, or Firm — Blank Rome LLP (57) ABSTRACT A machine tool has at least 5. A tool holder assembly permits a tool holder spindle to be displaced relative to the frame along a first axis of translation and along a second axis of translation perpendicular to the first axis of translation and implementing slides in a plane forming an angle of between +40° and +50° relative to the first axis of translation. A part holder assembly permits a part to be displaced along a third axis of translation perpendicular to the other axes of translation, about a first axis of rotation parallel to the third axis of translation and about a second axis of rotation perpendicular to the first axis of rotation. The length of the precision path connecting the part to the tool via the frame and the assemblies of the machine is less than 1600 mm.

16 Claims, 6 Drawing Sheets (51) Int. Cl.
    *B23C 1/14*     (2006.01)
    *B23Q 1/01*     (2006.01)
    *B23Q 1/48*     (2006.01)
    *B23Q 1/62*     (2006.01)
    *B23Q 41/04*     (2006.01)
    *B23C 1/00*     (2006.01)
    *B23B 3/06*     (2006.01)

(52) U.S. Cl.
    CPC ............... *B23C 1/14* (2013.01); *B23Q 1/012* (2013.01); *B23Q 1/015* (2013.01); *B23Q 1/017* (2013.01); *B23Q 1/621* (2013.01); *B23Q 41/04* (2013.01); *B23C 2220/32* (2013.01); *B23Q 2220/004* (2013.01); *Y10T 29/5109* (2015.01); *Y10T 409/305768* (2015.01); *Y10T 409/305824* (2015.01); *Y10T 409/308288* (2015.01); *Y10T 409/309576* (2015.01)

(58) Field of Classification Search
    CPC ....... B23C 2220/32; B23C 1/14; B23C 1/002; B23C 1/06; Y10T 409/305824; Y10T 409/30896; Y10T 409/305768; Y10T 29/5109; Y10T 29/5114; Y10T 409/305656–305824; Y10T 408/545; Y10T 409/309576; Y10T 409/307728; Y10T 409/308288; Y10T 408/91; B23B 3/065; B23B 3/162; B23B 3/165; B23B 3/168; B23B 11/00; B23B 2270/56; B23B 39/006
    USPC ................ 409/224, 165–168, 235, 202, 212; 29/27 R, 27 C; 408/71, 234
    See application file for complete search history.

(56) References Cited

U.S. PATENT DOCUMENTS

| | | | | |
|---|---|---|---|---|
| 6,682,276 | B2 * | 1/2004 | Harami | B23Q 1/4857 160/202 |
| 8,714,535 | B2 | 5/2014 | Jung et al. | |
| 8,769,791 | B2 * | 7/2014 | Kawada | B23Q 1/015 29/281.1 |
| 10,421,166 | B2 * | 9/2019 | Suzuki | B23Q 11/0825 |
| 10,556,307 | B2 * | 2/2020 | Suzuki | B23Q 1/5437 |
| 2008/0175684 | A1 * | 7/2008 | Schmidt | B23Q 1/012 409/212 |
| 2010/0003098 | A1 * | 1/2010 | Faigle | B23C 3/06 409/132 |
| 2013/0207331 | A1 | 8/2013 | Jung et al. | |
| 2018/0272483 | A1 * | 9/2018 | Suzuki | B23Q 1/5437 |

FOREIGN PATENT DOCUMENTS

| | | |
|---|---|---|
| CN | 103949895 A * | 7/2014 |
| DE | 102004034873 B3 * | 9/2005 |
| DE | 102005039818 A1 | 3/2007 |
| DE | 202010008327 U1 * | 1/2012 |
| DE | 102012201736 | 6/2013 |
| EP | 2283966 A1 | 3/2011 |
| JP | 60-167730 A * | 8/1985 |
| JP | 02-279249 A * | 11/1990 |
| JP | 10-277857 A * | 10/1998 |
| JP | 2003/324897 A | 11/2003 |
| JP | 2009/255239 A | 11/2009 |
| JP | 2010-162641 A * | 7/2010 |
| JP | 2011/025354 A | 2/2011 |
| JP | 2011-025386 A * | 2/2011 |
| JP | 2010-029947 A * | 2/2012 |
| JP | 2013/158908 A | 8/2013 |
| WO | WO-2006/072356 A1 * | 7/2006 |
| WO | WO-2012/157818 A1 * | 11/2012 |
| WO | WO-2015/111070 A2 | 7/2015 |
| WO | WO-2017/056255 A1 * | 4/2017 |

OTHER PUBLICATIONS

Machine Translation of JP 10-277857 A, which JP '857 was published Oct. 1998.*
Brochure from Roland for DWX Series Dental Milling Machines, obtained from http://www.digitaldentallab.com/dwx50_complete.pdf, two pages, dated Feb. 2011.*
Machine Translation of CN 103949895-A, which CN '895 was published Jul. 2014.*
International Search Report for PCT/IB2017/052248 dated Aug. 23, 2017, 4 pages.

* cited by examiner

FIVE AXIS MACHINE TOOL

This application is a national phase of PCT/IB2017/052248, filed on Apr. 19, 2017, which claims the benefit of Swiss Application No. 00516/16, filed on Apr. 19, 2016.

TECHNICAL FIELD

The present invention relates to a five axis machine tool and a method for manufacturing said five axis machine tool.

PRIOR ART

The machining precision of conventional machine tools, in particular numerically controlled (CNC) machine tools, depends, in particular, on their rigidity; very rigid and thus very heavy machines are used in order to machine parts with a high degree of precision, in particular when the precision has to extend to microns.

Such machines, however, are costly and bulky. The large parts which constitute such machines are also subject to significant expansion, such that the machines have to be air-conditioned. These parts of large dimensions have natural frequencies which are relatively low and which interfere with the machining process and have to be damped, generally by means of very heavy frames and supporting parts. Moreover, the significant mass of the mobile parts provides them with a considerable inertia which limits the possibility of accelerating or changing direction at high speed. The capacity for machining curved surfaces at high speed is thus limited.

Machine tools which are much smaller and which may be placed on a workbench or even loaded into a case are also known. The lack of rigidity and the single application of these machines, however, permits neither precision machining nor a high level of flexibility.

BRIEF SUMMARY OF THE INVENTION

An object of the present invention is to propose a machine tool which does not have the limitations of the known machine tools.

A further object is to propose a machine tool with a very low energy consumption.

According to the invention, these objects are achieved, in particular, by observing that the errors due to expansion are often more significant than the problems due to rigidity, in particular when machining at very high speed and with a very high level of precision.

Based on this observation, an object of the invention is to produce a machine in which, intrinsically, the problems of expansion are remedied.

In order to achieve this object, the invention aims, in particular, to reduce the length of the "precision path", also called the force loop. The precision path is the length of the path which connects the part to be machined to the tool passing via rigid parts, in particular via parts which are structurally rigid and lightweight which form the structure of the axes of the machine. The shorter this path, the less the expansion will be significant and disadvantageous.

This reduction in the path inevitably causes a reduction in the volume of the mobile parts and of the frame, and thus a loss of rigidity. One of the objects of the invention is, therefore, to propose a construction which permits this path to be reduced without impairing the rigidity more than is necessary.

These somewhat contradictory objects of the invention are achieved, in particular, by means of a machine tool according to the present invention.

The machine tool according to the present invention is suitable, in particular, for machining small parts, for example parts having maximum dimensions which are less than 80 mm, preferably less than 50 mm. By being limited to the machining of small parts it is possible to produce a machine which is much more compact and above all more reactive and more precise due to the reduction in the precision path and the lengths of the parts, the expansion thereof influencing the precision.

In order to increase the rigidity and to minimize the effect of geometric errors, it has been observed that it is efficient to reduce the length of the cantilevered elements. A surface error of a few microns on a slide is amplified if the carriage which is displaced along this slide has large dimensions.

The construction according to the present invention permits the space or the angular distances between the different axes to be distributed in a substantially equal manner between the tool and the part, which permits the structural impact of each individual axis to be reduced.

For example, the angle between the first axis and the plane of the second axis X is 45°; the angle between this plane and the third axis Y is once again 45°. The angle between the third axis Y and the axis of rotation C is 90°; the first axis of rotation is located in this segment between Y and C.

A spatial configuration of axes in which the axes converge toward the part to be machined (force triangle), permits to reduce the machining errors since this particular configuration prevents an accumulation of geometric errors and/or thermal expansion of the structures of the axes.

A ratio of 5:1 has been defined between the structure of the axis of the machine and the part which it machines, in particular between the machinable volume of the part and the structure of the axes of the machine (i.e. the volume of the machine with each mobile element of the mobile part holder and mobile tool holder assemblies in their median positions).

The gain in space is at least 3 to 5 times relative to conventional machines.

In order to increase the rigidity, the length of the precision path connecting the tool to the part via the two mobile assemblies and the frame is less than 600 mm.

The shape of this precision path substantially forms a half-ellipse: i.e. the maximum vertical distance between the axis b and the lower end of the slide of the first axis is also reduced as far as possible, but is nevertheless larger than the horizontal distance between the axis Z and the horizontal end of the slide Y. This egg shape permits to increase the rigidity of the assembly.

By reducing the mass of the mobile parts, the energy efficiency is improved. A conventional machine tool typically has an installed power of 10 to 20 KW; 350 W-550 W at a comparable machining speed is sufficient for the machine according to the present invention.

The targeted gains in energy are at least 10 times relative to conventional machines. No loss of machining quality is to be anticipated.

Due to this energy efficiency, the machine does not heat up to any significant extent. It is also less susceptible to expansion. Thus it is not necessary to air-condition this machine.

Air cooling (natural or ventilated) may be implemented.

The reduction in mobile masses permits the inertia thereof to be reduced and thus the tool to be operated at constant speed without having to decelerate the tool around corners or at the end of travel.

The weight of the mobile masses is preferably less than 10 kg.

Machining speeds in the order of 20 m/min or more may be obtained with radii of curvature of 0.5 mm.

Accelerations of 2.5 G of the tool may be obtained.

This machining at a speed which is virtually constant permits the surface quality of the machined parts to be improved and the length of the service life of the tools to be increased.

The machine axes and the slides are optimized to reduce friction. Thus the noise is also considerably reduced.

The reduction in volume of the machine permits the space requirement on the floor to be reduced and thus the need for factory space.

The proposed machining tool is particularly suited to machining at high speed (HSM) using a spindle which is set in rotation at a speed which is greater than 50,000 rpm, preferably up to 100,000 rpm.

Thus the need for lubrication is reduced or eliminated.

The small size of the mobile masses also makes it possible to push back the vibration frequencies inherent in the structure of the axes to high values which do not interfere with the machining process. Vibration frequencies of 250 Hz or more may be obtained with this geometry and these dimensions.

The subject of the invention is also a microfactory in which it is possible to benefit from the reduced size of the machine tools in order to multiply the number thereof.

The subject of the invention is also a method for high speed machining HSM.

BRIEF DESCRIPTION OF THE FIGURES

Exemplary embodiments of the invention are indicated in the description which is illustrated by the accompanying figures.

EXEMPLARY EMBODIMENTS OF THE INVENTION

FIGS. 1 to 4 illustrate a machine tool 1 having five axes according to the invention.

The machine tool 1 comprises a frame 3 in order to position the machine 1 for operation above a work surface, such as a table or machining bench, so as to permit an operator to carry out machining via the machine 1. The machine 1 comprises a mobile tool holder assembly 5 (also referred to herein as "a mobile tool holder") permitting a tool holder spindle 7 to be displaced relative to the frame and a mobile part holder assembly 11 (also referred to herein as a "mobile part holder") permitting a part 150 to be machined to be displaced relative to the frame.

The mobile tool holder assembly 5 is arranged so as to permit a displacement of the tool holder spindle 7 relative to the frame along a first axis of translation (Z) and along a second axis of translation (X) perpendicular to the first axis. The second axis of translation (X) implements slides 9 in a plane (p) forming an angle .alpha.1 ranging between +40° and +50° relative to the first axis of translation (Z).

The mobile part holder assembly 11 is configured to displace the part to be machined relative to the frame 3 according to:

a third axis of translation (Y) perpendicular to said first and second axes of translation Z, X, a first axis of rotation (b) parallel to the third axis of translation (Y) and a second axis of rotation (c) perpendicular to the first axis of rotation (b).

Figure 1:
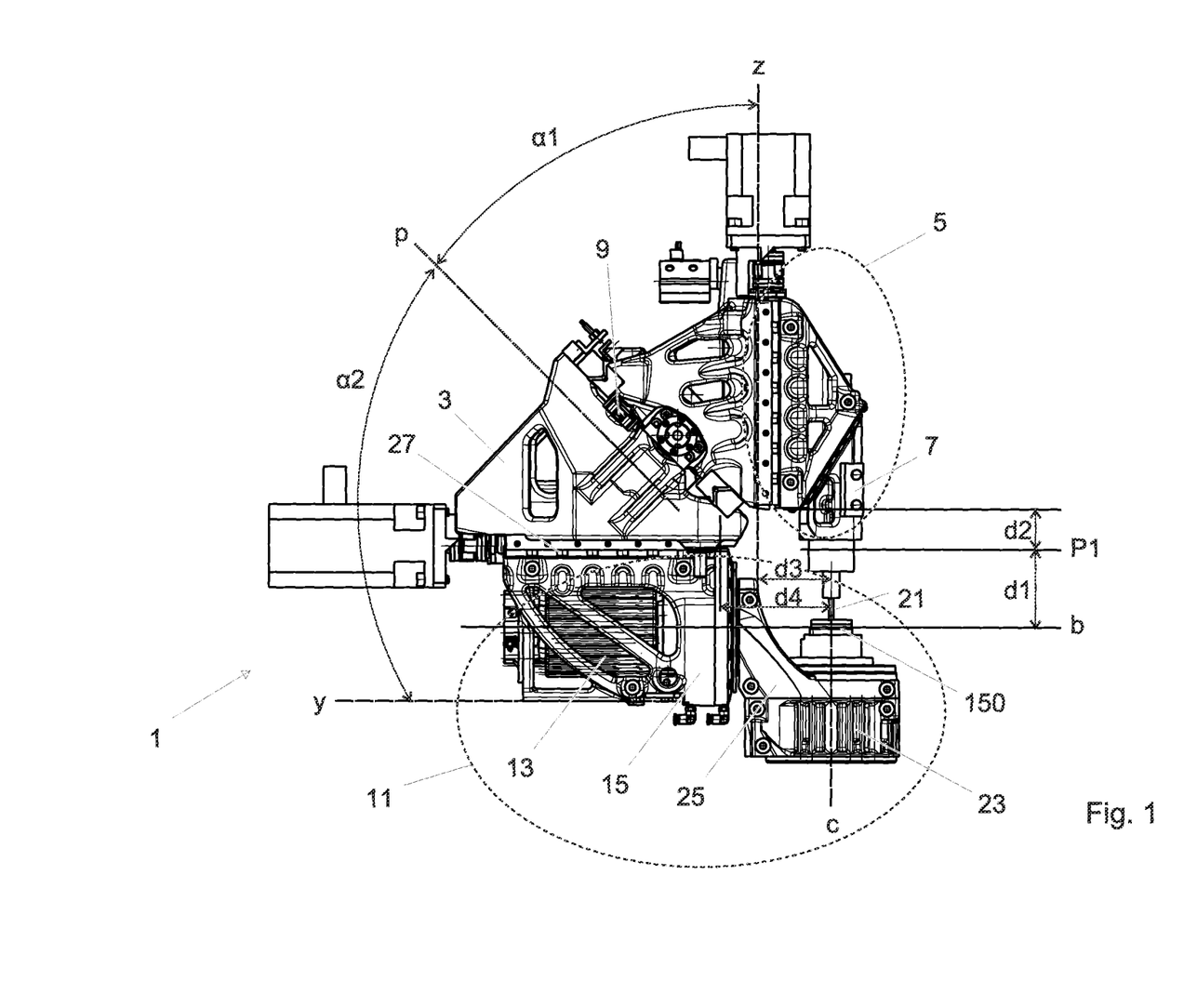
FIGS. 1 to 4 illustrate a machine tool having five axes according to the invention.
Figure 2:
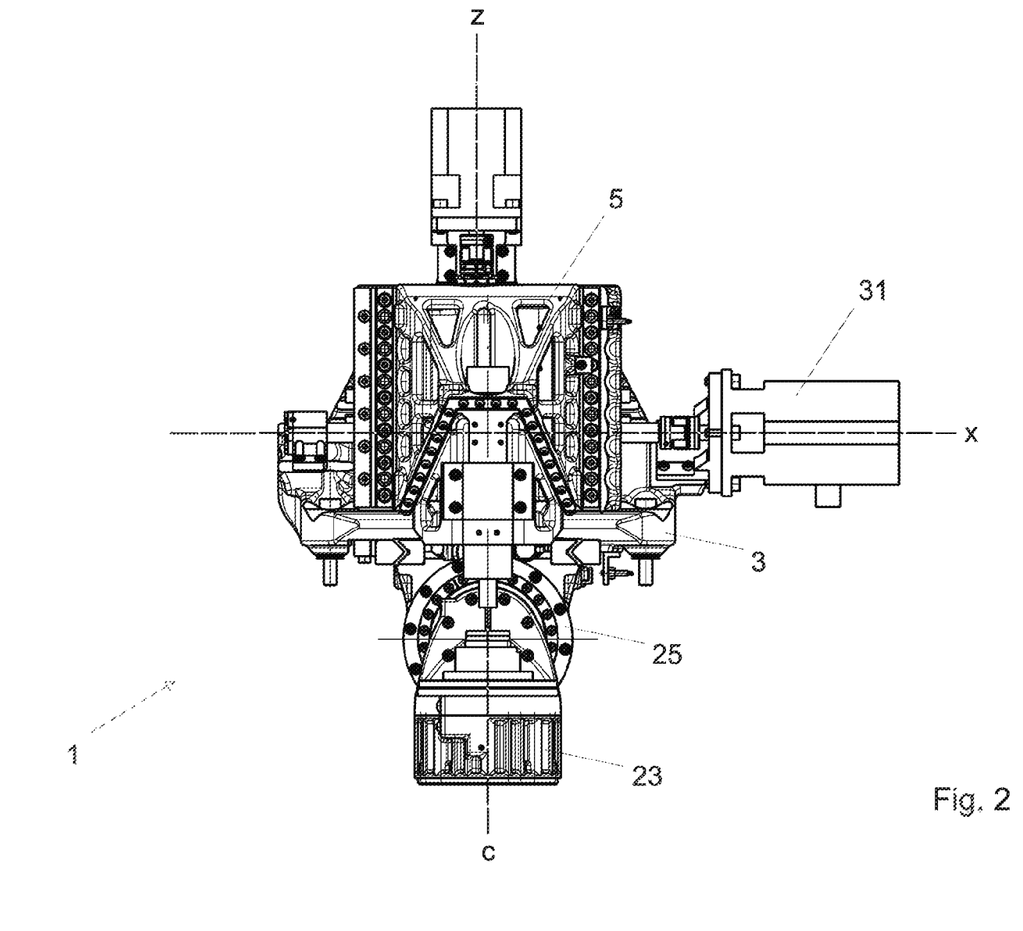
Figure 3:
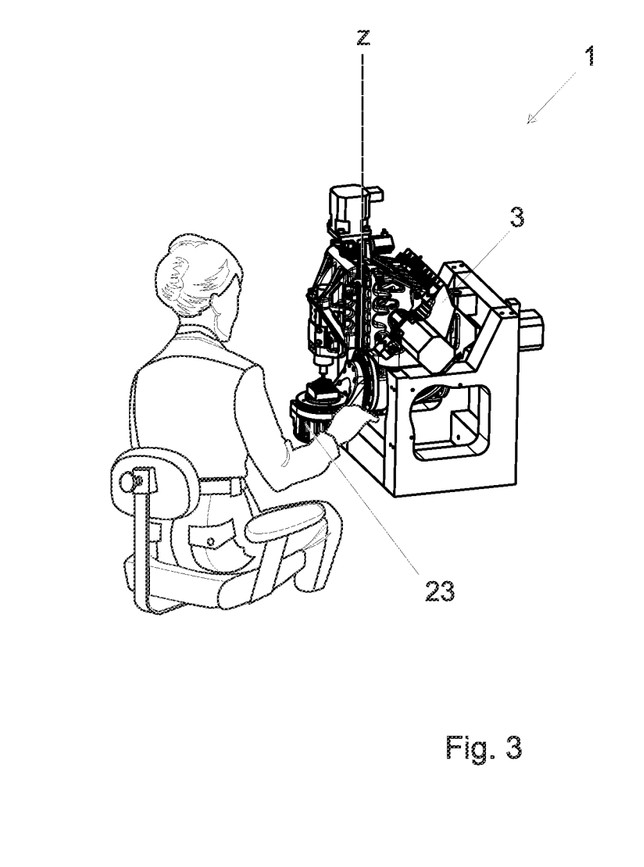
Figure 4:
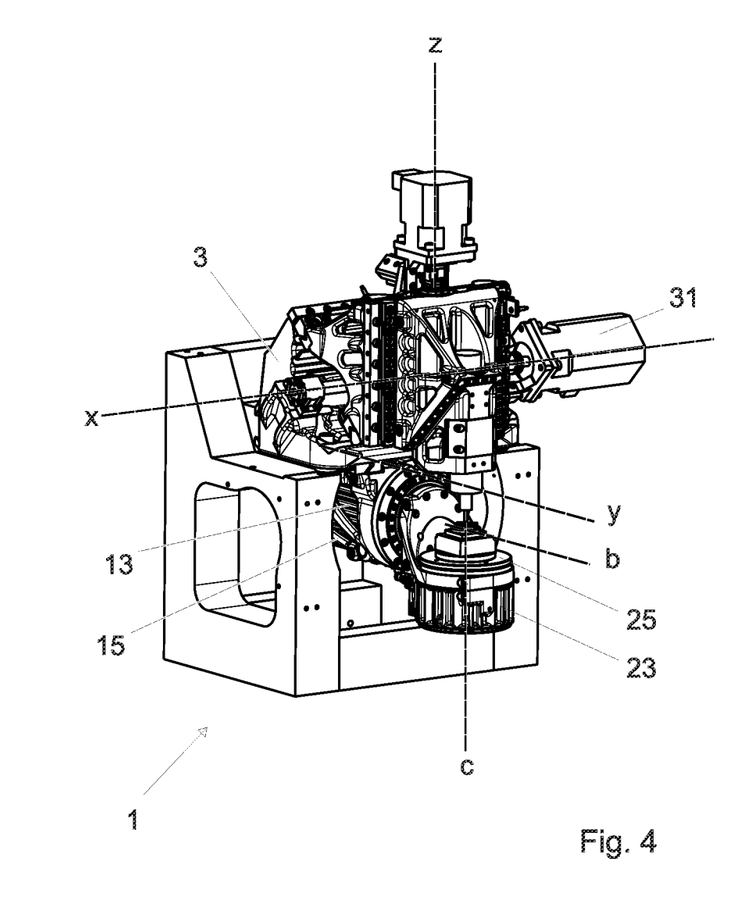

The first axis of translation (Z) corresponds to the direction of machining of the part. FIG. 3 illustrates a preferred positioning of the machine 1, having the first axis (Z) oriented vertically, i.e. in the direction of gravity.

According to this preferred positioning of vertical machining, the first axis of translation Z is vertical whilst the second axis of translation X is horizontal. The third axis of translation (Y) and the first axis of rotation (b) are oriented horizontally, perpendicular to X.

It is naturally possible to rotate the machine so as to place the first axis Z horizontally (perpendicular to the direction of gravity) or in an inclined manner relative to the direction of gravity. For the requirements of the text, the vertical direction is thus defined as being that of the axis Z.

The length of the precision path, also called the force loop, of the machine which connects the part to the tool, passing through the frame and said part holder and tool holder assemblies, is less than 1000 mm. The frame 3, as shown in FIGS. 1 to 4, has a first surface parallel to the plane of slides 9 and a second (bottom undersurface) surface parallel to the third axis of translation (Y).

The axial configuration of this machine in addition to its small force loop (its short distance) makes it possible to propose a machine tool which reduces the propagation as well as the amplification of the effects of thermal expansion of these assemblies on the relative positioning between the tool holder spindle and the part to be machined. This considerably reduces the time for starting up the machine.

Figure 5:
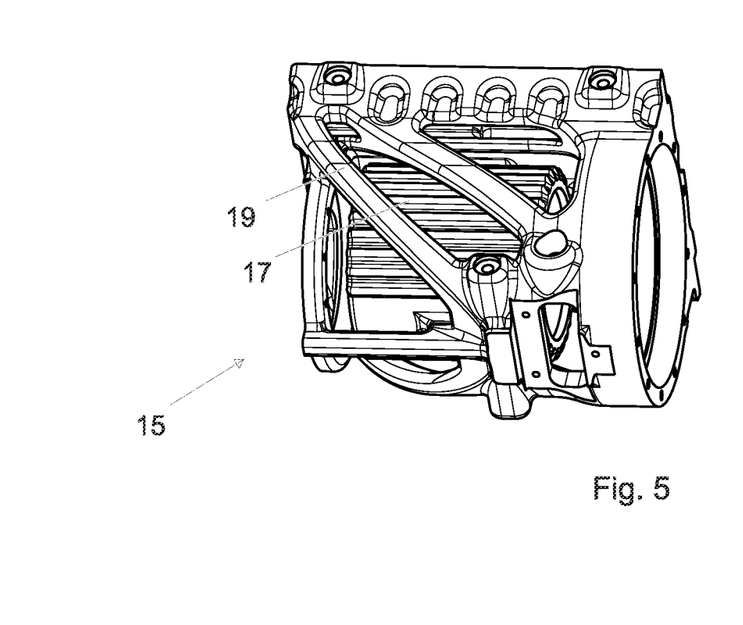
FIGS. 5 and 6 illustrate a carriage.
Figure 6:
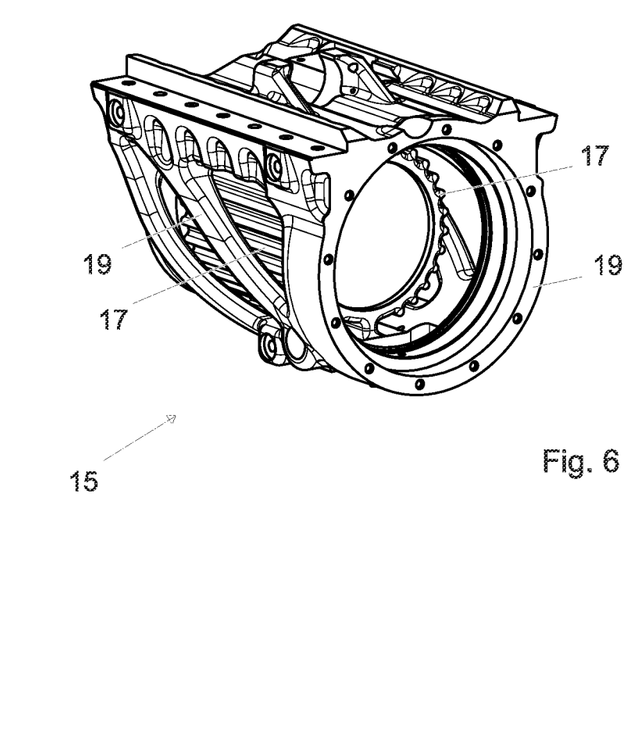

The machine comprises a mobile carriage 15 along the third axis of translation Y. This carriage which is illustrated by FIGS. 5 and 6 houses a motor 13 permitting a rotation of the part 150 about the first axis of rotation (b). The carriage comprises a cylinder 17 provided with ribs for housing and cooling this motor 13 and an openwork cage 19 around this cylinder.

Advantageously, the cage and the cylinder are formed from a single cast part, the contact surface between the cage and the cylinder being less than 10 cm$^2$ to minimize the transmission of heat from the motor to the cage.

The machine is provided with a motor 23 which is configured to permit a rotation of the part about the second axis of rotation (c). The motor 23 is mounted so as to be mobile along the third axis of translation (Y) and about the first axis of rotation (b), since it is retained by a support 25 mounted on the axis of the motor 13 of the first axis of rotation (b).

The machine comprises slides 27 (also referred to herein as 'second slides') which are arranged in a first plane and which operate along the third axis of translation Y. This first plane is preferably horizontal when the machine is configured for vertical machining. The mobile part holder assembly 11 is suspended from and below the bottom undersurface of the frame 3, as can be seen in at least FIGS. 1-4.

Advantageously, the machine 1 is arranged such that the distance (d1) in the direction of machining (first axis of translation Z) between this first plane and the first axis of rotation (b) is less than 10 cm.

The machine comprises slides (also referred to herein as 'third slides') which are arranged in a second plane and which operate along the first axis of translationZ. Advantageously, the machine 1 is arranged such that the distance d2 in the direction of machining (first axis of translation Z) between the lower end of these vertical slides and said first plane is less than 10 cm.

Advantageously, the machine 1 is arranged such that the distance d3 perpendicular to the machining direction (first axis of translation Z) between the axis of rotation of the spindle and the second plane is less than 10 cm.

Advantageously, the machine 1 is arranged such that the distance d4 perpendicular to the direction of machining (first axis of translation Z) between the axis of rotation of the spindle and the end of said slides 27 of the first plane is less than 10 cm.

The slides which converge toward the part to be machined permit to reduce machining errors since this configuration counteracts an accumulation and/or an amplification of geometric errors and/or the expansion of each slide.

The increased rigidity of the machine 1 relative to known machining tools of small dimensions permits a use of the machine tool at high speed (HSM).

High speed machining is a machining technique characterized by a cutting speed which is generally at least four to ten times greater than during conventional machining.

The HSM cutting speed, as regards the machining of steel, corresponds to a speed range of between 500 and 2000 m/min (meters per minute), whilst the conventional machining speed is limited to a range of 30 to 200 m/min. The speed of rotation of the spindles is thus typically greater than 20,000 rpm, for example in the order of 50,000 to 100,000 rpm.

The HSM machining conditions permit, in particular, a reduction in the propagation of heat released during the machining operation to the components of the machine, in particular to the part holder. The higher machining speed permits a greater portion of the heat to be removed via the chips, this with respect to conventional machining.

This solution subsequently permits the thermal expansion of the structure of the machine to be limited below a critical threshold.

The ratio 1:5 between the part and the structure of the axes permits a reduction in the electrical consumption of the machine. More specifically, a significant reduction in the inertia obtained by the miniaturization of the structure of the axes (ratio 1:5 between the part and the structure of the axes) coupled with an HSM machining strategy at an increased cutting speed relative to a conventional machining, permits to reduce the energy required for machining a part, for example passing from a total consumption of 10 KW to 550 W or even 300 W. This solution subsequently reduces the costs of operating the machine as well as the thermal energy produced by the devices for actuating the machine, which permits to free the thermal stabilization of the structure of the machine tool from an air-conditioning solution.

The HSM machining and the small dimension of the mobile parts permits to obtain relatively high natural frequencies with respect to conventional machines, in the order of 250 Hz or more. These relatively high natural frequencies interfere less with the machining process and thus do not have to be damped by means of very heavy frames and support parts, which does not limit the capacity to accelerate or change direction at high speed.

The limitation of the masses in motion of the machine, in particular below 10 Kg, makes it possible to obtain greater machining capacity relative to the machines of the prior art, in particular due to greater accelerations and a reduction in the inertia which avoids the need to decelerate on corners.

Figure 7:
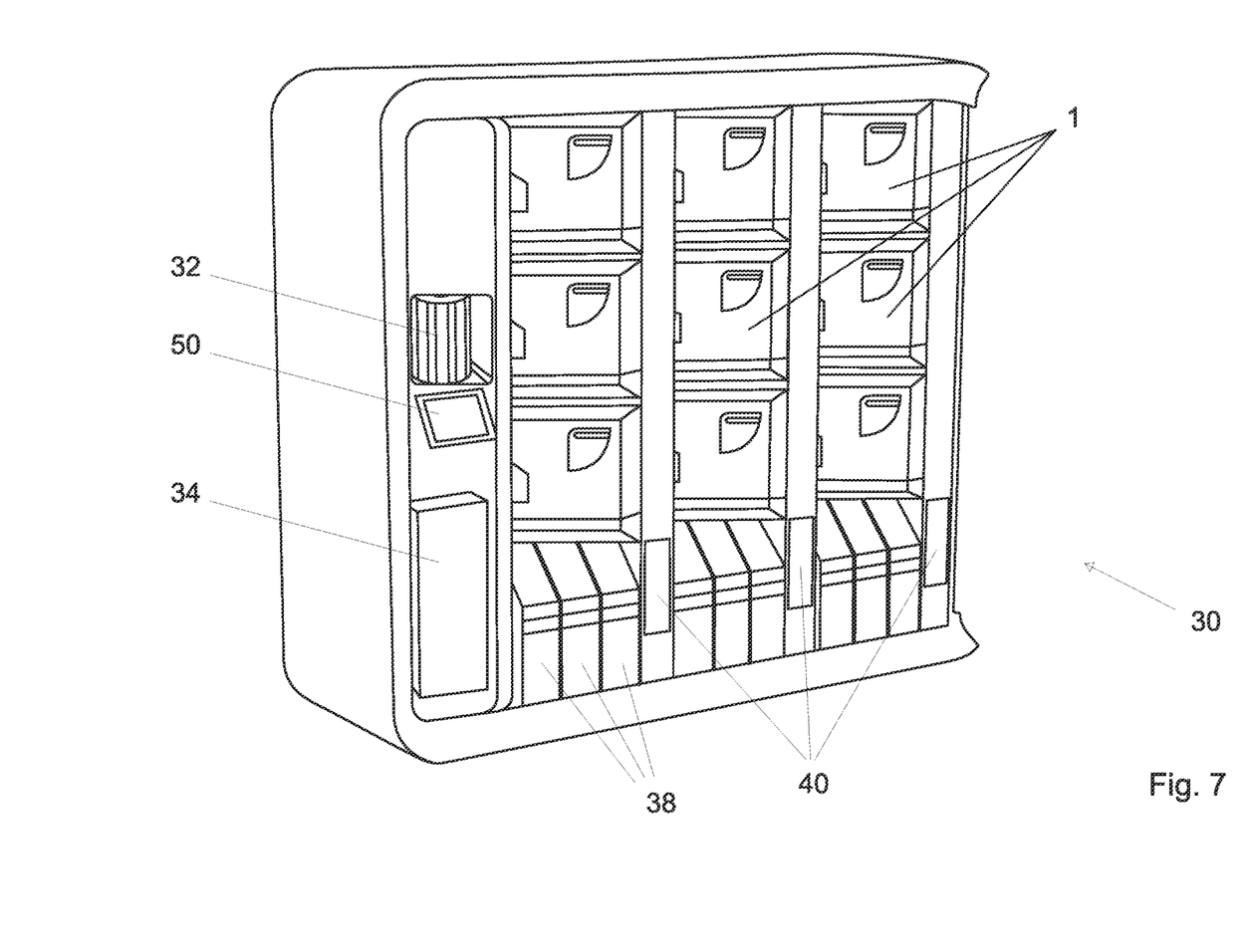
FIGS. 7 and 8 illustrate a microfactory having a plurality of machine tools.
Figure 8:
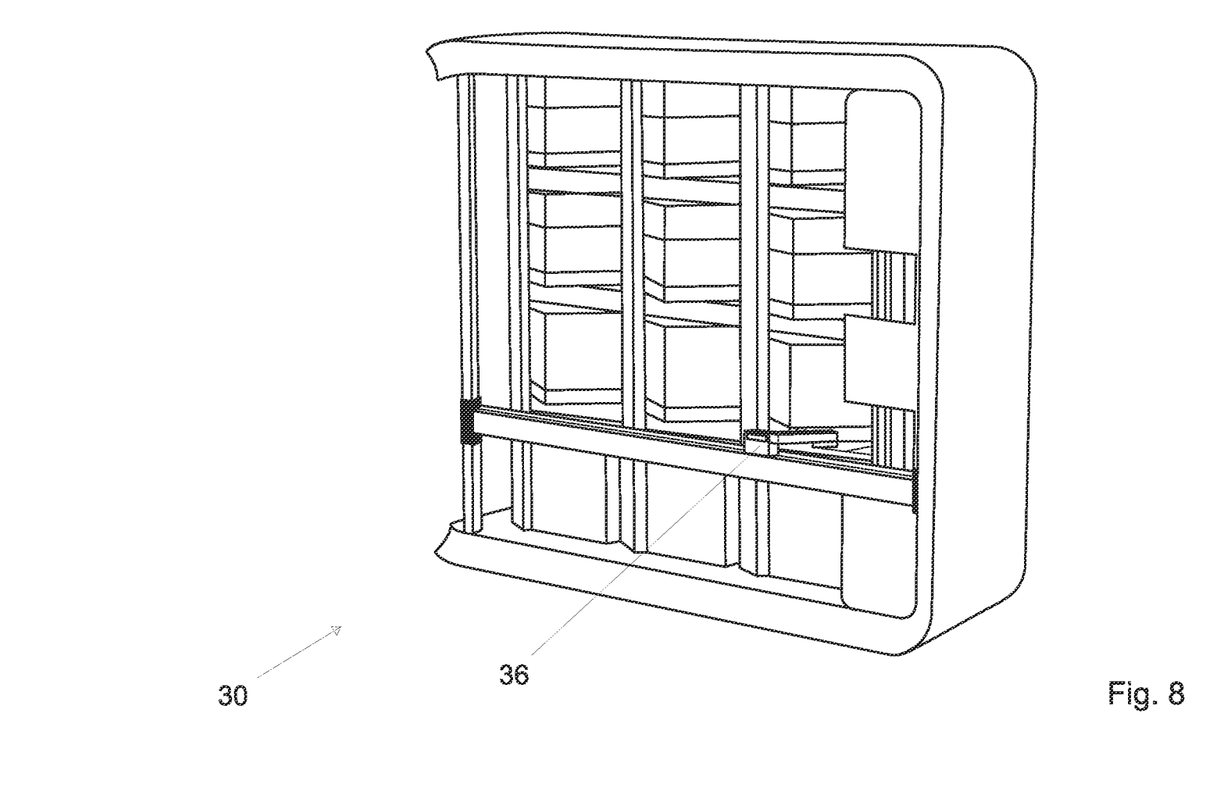

FIGS. 7 and 8 illustrate a microfactory 30 comprising a plurality of machine tools 1.

The machining center 30 comprises a plurality of compartments which are each designed to operationally house a machine tool 1.

Due to the reduced dimensions of the machines 1, these compartments are able to be arranged, not only ones juxtaposed relative to others, but also ones superimposed on top of others.

Advantageously, a first of these machine tools is configured to operate, in particular, for machining a first part in a synchronized manner with a second of these machine tools so as to attenuate and/or reduce the propagation of vibrations generated by the second machine during the machining of a second part.

This solution makes it possible to reduce the vibrations generated and propagated in the structures of the machining center which makes it possible to attenuate the negative effects thereof on the machining precision of the machines of the center.

The machining center comprises a magazine of tools 32 and a magazine of parts 34 which are made available to a portion, advantageously to all, of the machines 1 of the machining center. The center comprises a robot 36 which is configured to be able to transport parts and/or tools between one of the magazines 32, 34 and each of these machines in order to permit the machining of the part.

The magazine of parts 32 may be advantageously configured to store the parts to be machined, the intermediate parts and the finished parts.

Advantageously, the machining center may comprise one or more shared stations or shared devices which are common to a plurality of machines of the center, in particular:
an electrical supply;
an extractor for removing fumes;
a system for recovering chips (40);
an extinguisher;
a security door; and/or
a sprinkler system.

The microfactory houses an individual amplifier 38 for generating control signals of each machining tool.

The arrangement of the machines 1 of the microfactory 30 in a matrix, i.e. in a plurality of columns and rows, firstly makes it possible to make a better use of the spaces available in a machining room, reducing the costs of arranging the machines. This arrangement also permits to shorten the distances of displacement of the robot when transporting parts and/or tools from or to the machining tools.

Moreover, this space arrangement of the machining tools in a matrix advantageously makes it possible to house, in one or more of these space, a measuring machine designed for calibrating these machine tools and for verifying the quality of the produced parts.

The machining center may also comprise at least a finishing machine and/or a cleaning machine in one of said spaces.

The machining center may also comprise a user interface, such as a tablet 50, for monitoring the entire machining center, in particular the machine tools thereof, the stations or shared devices thereof, the measuring machine, the finishing machine and/or the cleaning machine.

The invention further relates to a method for manufacturing a machine tool, such as the above-mentioned machine tool 1, comprising at least one mobile assembly 5, 11 permitting to displace a tool holder spindle 7 with respect to a part 150 to be machined.

The method of manufacturing the machine tool comprises a step of determining the space requirement of the machine tool; a step of selecting an architecture; a step of optimizing the rigidity of the machine and a step of reducing the masses in motion.

The determination of the space requirement of the machine tool comprises, notably, a dimensioning of the size of the machine tool, i.e. a dimensioning of the structure of the axes of the machine as a function of the maximum size of the parts which are machinable by the machine.

The maximum size of the parts which are machinable by the machine may be defined as the maximum machinable volume by the machine tool. The volume may be defined by means of a geometric shape describing a typology of the parts to be machined. In the field of watchmaking and jewelry, the volume may be advantageously described by a cubic shape so as to represent more effectively the most diverse parts of watchmaking and jewelry, irrespective of their orientation.

The dimensioning of the structure of the axes of the machine is carried out by multiplying a factor of the structure of the axes by the maximum machinable volume by the machine.

Tests carried out by the Applicant have proved that a factor of the structure of the axes of between 3 and 7 permits the production of a compact machine tool, whilst still remaining efficient. Studies by the Applicant have validated a ratio of 5:1 between the dimensions of the maximum part to be machined (dimension of the maximum machinable volume) and the dimensions of the machine (dimension of the volume of the machine, i.e. the structure of the axes of the machine) in particular for machining cubic volumes having sides of 50 to 100 mm.

Mobile assemblies having reduced maximum paths relative to conventional machines permit a significant reduction in the consumption of energy of the machine, since the masses which have to be driven in motion (in particular by motors) are more lightweight.

The determination of the space requirement of the machining tool further comprises a definition of the precision path (force loop) as a function of the dimensioning of said structure of the axes of the machine, i.e. as a function of the maximum machinable volume by the machine tool.

The precision path, also called the force loop, is determined by the shortest path connecting the part to be machined to the tool passing via the rigid parts of the machine when all of its slides are in the center.

The precision path thus represents the lines of force passing through the different structures of the machine, in particular through the mobile assembly 5, 11 from the tool to the part.

The optimal precision path is determined by multiplying a path factor by one of the dimensions of the structure of the axes, in particular one of its sides when the structure of the axes has a cubic shape.

Tests carried out by the Applicant have shown that a path factor of 0.3 to 0.9 multiplied by one of the sides of the cubic volume representing the structure of the axes makes it possible to reduce the expansion of the components of the machine, in particular the rigid structures of the mobile assembly 5, 11. Studies by the Applicant have proved that a path factor equal to 0.6 is particularly advantageous.

The step of optimizing the rigidity of the machine comprises the production of rigid structures of the machine, in particular of the mobile assembly, preferably by means of (substantially) closed shell structures.

A shell structure is a solid delimited by two principal surfaces which are close and approximately parallel to one another. A (substantially) closed shell structure is a shell structure which is closed onto itself and/or delimited by a peripheral surface (the edge) which joins the two principal surfaces.

This solution permits to realize structures that are rigid but remain lightweight, which subsequently permits to reduce the energy consumption of the machine, in particular of its motors driving the mobile assemblies in motion.

The invention claimed is:

1. A machine tool for machining a part, comprising:
   a frame having an upper surface and a bottom undersurface,
   a mobile tool holder having a tool holder spindle, said mobile tool holder mounted on the upper surface of the frame, the tool holder spindle being displaceable relative to the frame along a first axis of translation, and the mobile tool holder and the tool holder spindle being displaceable relative to the frame along a second axis of translation perpendicular to the first axis of translation, the upper surface extending at an angle of between 40° and 50° relative to the first axis of translation, a first slide, along which the mobile tool holder is displaced as the mobile tool holder is moved along the second axis of translation, being provided on the upper surface of the frame,
   a mobile part holder holding the part, said mobile part holder suspended from and below the bottom undersurface of the frame, the mobile part holder comprising a carriage that is displaceable relative to the frame along a third axis of translation perpendicular to said first and second axes of translation, said mobile part holder having a first axis of rotation parallel to the third axis of translation to rotate the part about the first axis of rotation, and said mobile part holder having a second axis of rotation perpendicular to the first axis of rotation to rotate the part about the second axis of rotation.

2. The machine tool according to claim 1, wherein a first motor rotates the part about the first axis of rotation, and the first motor is mobile along the third axis of translation.

3. The machine tool according to claim 2, wherein the carriage houses the first motor, said carriage comprising:
   a cylinder to house the first motor, said cylinder having passive cooling means comprising ribs to cool the first motor, and
   an openwork cage around said cylinder,
   the cage and the cylinder being formed by a single cast part, a contact surface between the cage and the cylinder being less than 10 cm$^2$ to minimize the transmission of heat from the first motor to the cage.

4. The machine tool according to claim 2, wherein a second motor that rotates the part about the second axis of rotation is mobile along the third axis of translation and about the first axis of rotation.

5. The machine tool according to claim 4, comprising a support for the second motor.

6. The machine tool according to claim 1, the third axis of translation being horizontal, said machine tool comprising a second slide extending in a horizontal plan and extending in a direction of the third axis of translation, a distance along the first axis of translation between the horizontal plane and the first axis of rotation being less than 10 cm, the first axis of translation being vertical, said machine tool having a third slide extending in a vertical plane and extending in a direction of the first axis of translation, a distance along the first axis of translation between a lower end of the third slide and said horizontal plane being less than 10 cm.

7. The machine tool according to claim 6, a distance perpendicular to the first axis of translation between an axis of the spindle and said vertical plane being less than 10 cm.

8. The machine tool according to claim 7, a distance perpendicular to the first axis of translation between the axis of the spindle and said second slide being less than 10 cm.

9. The machine tool according to claim 1, the tool holder spindle is configured to be set in rotation at a speed greater than 50,000 rpm.

10. The machine tool according to claim 1, wherein when the machine tool is operationally positioned so as to machine said part,
the first axis of translation is oriented vertically,
the second axis of translation is oriented horizontally, and
the third axis of translation is oriented horizontally.

11. The machine tool of claim 1, a length of a precision path connecting the part to a tool via said frame and said mobile tool holder and said mobile part holder being less than 1600 mm.

12. The machine tool of claim 1, a length of a precision path connecting the part to a tool via said frame and said mobile tool holder and said mobile part holder being less than 1000 mm.

13. A microfactory comprising a plurality of machine tools according to claim 1 superimposed on top of one another.

14. The microfactory according to claim 1, comprising a plurality of machine tools according to claim 1 juxtaposed relative to one another.

15. A method for machining comprising:
providing a machine tool according to claim 1;
using the tool holder spindle to machine the part at a speed in a range from 500 to 2000 meters per minute, while the speed of rotation of the tool spindle is greater than 20,000 rotations per minute.

16. A machine tool for machining a part, comprising:
a frame,
a mobile tool holder having a tool holder spindle, said tool holder spindle being displaceable relative to the frame along a first axis of translation and along a second axis of translation perpendicular to the first axis of translation, a first slide, along which the mobile tool holder is displaced as the tool holder spindle moves along the second axis of translation, being provided to a surface of the frame that is in a plane forming an angle of between 40° and 50° relative to the first axis of translation,
a mobile part holder holding the part, said mobile part holder displaceable relative to the frame along a third axis of translation perpendicular to said first axis of translation, said mobile part holder having a first axis of rotation parallel to the third axis of translation to rotate the part about the first axis of rotation, and said mobile part holder having a second axis of rotation perpendicular to the first axis of rotation to rotate the part about the second axis of rotation,
a first motor that rotates the part about the first axis of rotation,
a carriage to house said the first motor, said carriage comprising:
a cylinder to house the first motor, said cylinder having passive cooling means comprising ribs to cool the first motor, and
an openwork cage around said cylinder.

* * * * *